United States Patent
van Bezooijen

(10) Patent No.: US 10,804,773 B2
(45) Date of Patent: Oct. 13, 2020

(54) SHAFT GROUNDING RING AND DISSIPATION BODY FOR A SHAFT GROUNDING RING

(71) Applicant: KACO GmbH + Co. KG, Kirchardt (DE)

(72) Inventor: Lucas van Bezooijen, Hardthausen (DE)

(73) Assignee: KACO GmbH + Co. KG, Kirchardt (DE)

( * ) Notice: Subject to any disclaimer, the term of this patent is extended or adjusted under 35 U.S.C. 154(b) by 203 days.

(21) Appl. No.: 16/150,292

(22) Filed: Oct. 3, 2018

(65) Prior Publication Data
US 2019/0109520 A1 Apr. 11, 2019

(30) Foreign Application Priority Data
Oct. 6, 2017 (DE) .......... 10 2017 009 360

(51) Int. Cl.
| | |
|---|---|
| *H02K 5/10* | (2006.01) |
| *H02K 11/40* | (2016.01) |
| *H02K 5/15* | (2006.01) |
| *H02K 7/00* | (2006.01) |

(52) U.S. Cl.
CPC .......... *H02K 11/40* (2016.01); *H02K 5/15* (2013.01); *H02K 7/003* (2013.01)

(58) Field of Classification Search
CPC .......... H02K 11/40; H02K 5/15; H02K 7/003
See application file for complete search history.

(56) References Cited

U.S. PATENT DOCUMENTS

| | | | |
|---|---|---|---|
| 2005/0023910 A1* | 2/2005 | Lukenich | H02K 3/522 310/71 |
| 2006/0007609 A1 | 1/2006 | Oh et al. | |
| 2015/0349477 A1 | 12/2015 | Riedmaier et al. | |
| 2016/0111941 A1* | 4/2016 | Sturm | H02K 11/40 310/68 R |
| 2016/0172810 A1* | 6/2016 | Luo | H02K 11/028 310/236 |

FOREIGN PATENT DOCUMENTS

| | | |
|---|---|---|
| DE | 200 21 796 | 5/2002 |
| DE | 101 52 360 | 10/2002 |
| DE | 10 2013 206 400 | 10/2014 |
| JP | 2008017664 | 1/2008 |
| JP | 2013031345 | 2/2013 |
| WO | 2017/148586 | 9/2017 |

* cited by examiner

*Primary Examiner* — Alexander Talpalatski
(74) *Attorney, Agent, or Firm* — Gudrun E. Huckett

(57) ABSTRACT

A shaft grounding ring has an annular housing made of an electrically conductive material and configured to be connected electrically conductively to a first machine element. At least one annular dissipation body electrically conductively connected to the annular housing is provided that is at least partially comprised of an electrically conductive material. The at least one annular dissipation body is configured to be electrically conductively connected to a second machine element. The at least one annular dissipation body has an annular section and further has elastically deformable flap sections connected to the annular section. The flap sections project away from the annular section, wherein the flap sections have different lengths.

20 Claims, 3 Drawing Sheets

SHAFT GROUNDING RING AND DISSIPATION BODY FOR A SHAFT GROUNDING RING

BACKGROUND OF THE INVENTION

The invention relates to a shaft grounding ring for dissipating induced voltages or electrical charges away from a first machine element, preferably a shaft, into a second machine element. The shaft grounding ring comprises an annular housing comprised of electrically conductive material that is connected electrically conductively with one of the machine elements and is electrically conductively connected with at least one annular dissipation body which is at least partially comprised of an electrically conductive material and is electrically conductively connected with the other machine element.

The invention further concerns a dissipation body for a shaft grounding ring comprised of an at least partially electrically conductive material and comprising an annular section.

Electric motors induce frequency-variable interference voltages at the drive shaft. The interference voltages can inter alia destroy the motor bearings or cause problems in regard to electromagnetic compatibility, for example, disturbing radio reception. The shaft currents cause at the running surfaces and the bearing balls of the motor bearings small craters caused by melting; this causes the running surfaces of the bearing to become covered with depressions over time and leads to the motor bearing failing in the end.

In order to dissipate electrical charges or voltages away from the motor shaft, shaft grounding rings are known (US 2006/0007609) which, as dissipation elements, comprise filaments which are fastened between two plates and project radially inwardly past these plates. The plates and the filaments are received in an annular housing that is connected electrically conductively with a grounded housing. The employment of the conductive filaments requires a complex and accordingly expensive manufacture of the shaft grounding ring. In use, there is moreover the risk that the filaments become detached and cause contamination and possibly also damage of the entire system up to the point of total failure of the system. A problem is also switching the rotational direction of the shaft because the filaments can follow the rotational direction reversal only with difficulty by appropriate adjustment.

Furthermore, shaft grounding rings are known (WO 2017/148586) in which the dissipation element is formed with a disk-shaped dissipation body comprised of electrically conductive material. The dissipation body has an elastically bendable rim area with which it is connected electrically conductively to the motor shaft.

The invention has the object to configure the shaft grounding ring of the aforementioned kind and the dissipation body of the aforementioned kind in such a way that the dissipation of induced voltages or charges away from the shaft is improved.

SUMMARY OF THE INVENTION

This object is solved for the shaft grounding ring of the aforementioned kind in accordance with the invention in that the dissipation body comprises an annular section from which elastically deformable flap sections are projecting which have different lengths.

This object is further solved for a dissipation body of the aforementioned kind in accordance with the invention in that elastically deformable flap sections of different lengths project away from the annular section.

The shaft grounding ring according to the invention comprises the dissipation body with the annular section from which the elastically deformable flap sections are projecting that have different lengths. The flap sections with different lengths form in the installed position of the shaft grounding ring different running tracks on the shaft. Due to the flap sections with different lengths, the contact surface between the dissipation body and the shaft is greatly increased whereby also a particularly good dissipation of the charges or voltages can be ensured. When the dissipation body comprises, for example, flap sections with two different lengths, then two running tracks are produced on the shaft with a correspondingly increased contact surface. The surface contact relative to the rotating shaft is significantly increased thereby. The multi-track shaft contact leads to a reduced wear at the counter running surface of the respective running track as well as to a longer service life of the component. Since the flap sections are distributed onto different running tracks, the heat development for each running track is also correspondingly reduced. The different running tracks ensure also an improved dissipation of the induced voltages or electrical charges in the long run.

The use of flap sections of different lengths provides the advantage that these flap sections can be configured such that they are contacting the shaft with contact pressures of different magnitude.

Advantageously, the flap sections of different lengths are distributed uniformly about the circumference of the annular section. In this way, a uniform dissipation of voltages or charges is provided about the circumference of the dissipation body or of the shaft.

In a simple embodiment, the flap sections of different lengths are arranged alternatingly one after another. Thus, a long section, a short section, a long section, and so on can be alternatingly arranged in circumferential direction.

However, it is also possible to provide, for example, two long flap sections, a short flap section, two long flap sections, a short flap section, and so on ane after another in circumferential direction.

Finally, the dissipation body can also be designed such that the flap sections of different lengths are not distributed in a uniformly arrangement about the circumference.

The uniform distribution of flap sections that have different lengths simplifies the manufacture of the dissipation body.

In a first advantageous embodiment, the flap sections are provided to have at least two different lengths. However, it is also possible that the flap sections of the dissipation body have more than two different lengths. This leads to a corresponding number of running tracks on the shaft.

An inexpensive and simple manufacture of the dissipation bodies and a uniform dissipation of the voltages or charges result when the section provided with the respective same length are of the same configuration among each other.

The flap sections of different lengths are projecting advantageously radially away from the annular section.

A simple and inexpensive manufacture of the shaft grounding ring with simultaneous good dissipation properties results when the annular section and the flap sections of different lengths are formed together as one piece.

The dissipation body is advantageously designed such that the flap sections of different lengths not only in the installation position of the shaft grounding ring but also in the initial, not yet installed (i.e., undeformed) state of the dissipation body are spaced apart from each other. In this way, it is ensured that the flap sections of different lengths upon installation of the shaft grounding ring can be elastically deformed without impairing each other.

The dissipation body is comprised in a preferred embodiment of electrically conducting PTFE (polytetrafluoroethylene). The electric conductivity results from corresponding electrically conductive fillers contained in the PTFE.

There is also the possibility to enclose the dissipation body completely by an electrically conductive coating which is, for example, a silver lacquer.

When using such an electrically conductive coating, the dissipation body itself can also be made of a material that itself is non-conductive or only minimally conductive. In this case, the dissipation body, for example, can be comprised of polyfluorocarbon, in particular PTFE.

The electrically conductive coating can also be an electrically conductive foil which is an inexpensive component. The foil can be, for example, a copper foil. Such foils have only minimal thicknesses of, for example, approximately only 0.03 mm. The connection of such an electrically conductive foil with the dissipation body can be provided in any suitable way, for example, by a suitable adhesive.

In order for the flap sections of different lengths to be reliably elastically bent in the installation position, it is advantageous when at least one portion of the flap sections of different lengths is provided with a joint. The joint ensures that the corresponding flap sections of different lengths can be elastically deformed to the required amount.

Advantageously, all flap sections of different lengths of the dissipation body are provided with such a joint.

The joint is advantageously formed by a weakened or reduced portion of the cross section, for example, by means of a stamping or turning process.

In a simple embodiment, the flap sections of different lengths have approximately a rectangular contour shape.

In another embodiment, the flap sections of different lengths can have a contour that is approximately T-shaped.

Moreover, the dissipation body can also be designed such that the flap sections of different lengths of the dissipation body have different circumferential contour shapes. For example, the long flap sections can have a T-shaped contour and the short flap sections can have a rectangular contour, or vice versa. Of course, the flap sections can also have other suitable contour shapes.

In case of a T-shaped contour shape, the flap sections have a web which extends in the circumferential direction of the dissipation body.

A good dissipation and large contact surface with compact configuration of the dissipation body result when the short T-shaped flap sections are arranged between the long T-shaped flap sections such that the webs of the short flap sections are covered radially by the webs of the neighboring long flap sections.

In principle, the shaft grounding ring can be provided in two installation positions. In one installation position, the flap sections of different lengths contact the shaft with elastic deformation. The annular housing of the shaft grounding ring is then electrically conductively connected with the dissipating machine element, for example, a housing of a motor bearing.

In the other installation position, the electrically conductive housing of the shaft grounding ring is fixedly seated on the shaft while the flap sections of different lengths are contacting electrically conductively the housing of the machine component.

The subject matter of the application results not only from the subject matter of the individual claims but also from all specifications and features disclosed in the drawings and the description. The specifications and features are, even if they are not subject matter of the claims, considered as being important to the invention inasmuch as, individually or in combination, they are novel relative to the prior art.

BRIEF DESCRIPTION OF THE DRAWING

The invention will be explained in detail with the aid of two embodiments illustrated in the drawings.

DESCRIPTION OF THE PREFERRED EMBODIMENTS

Figure 3:
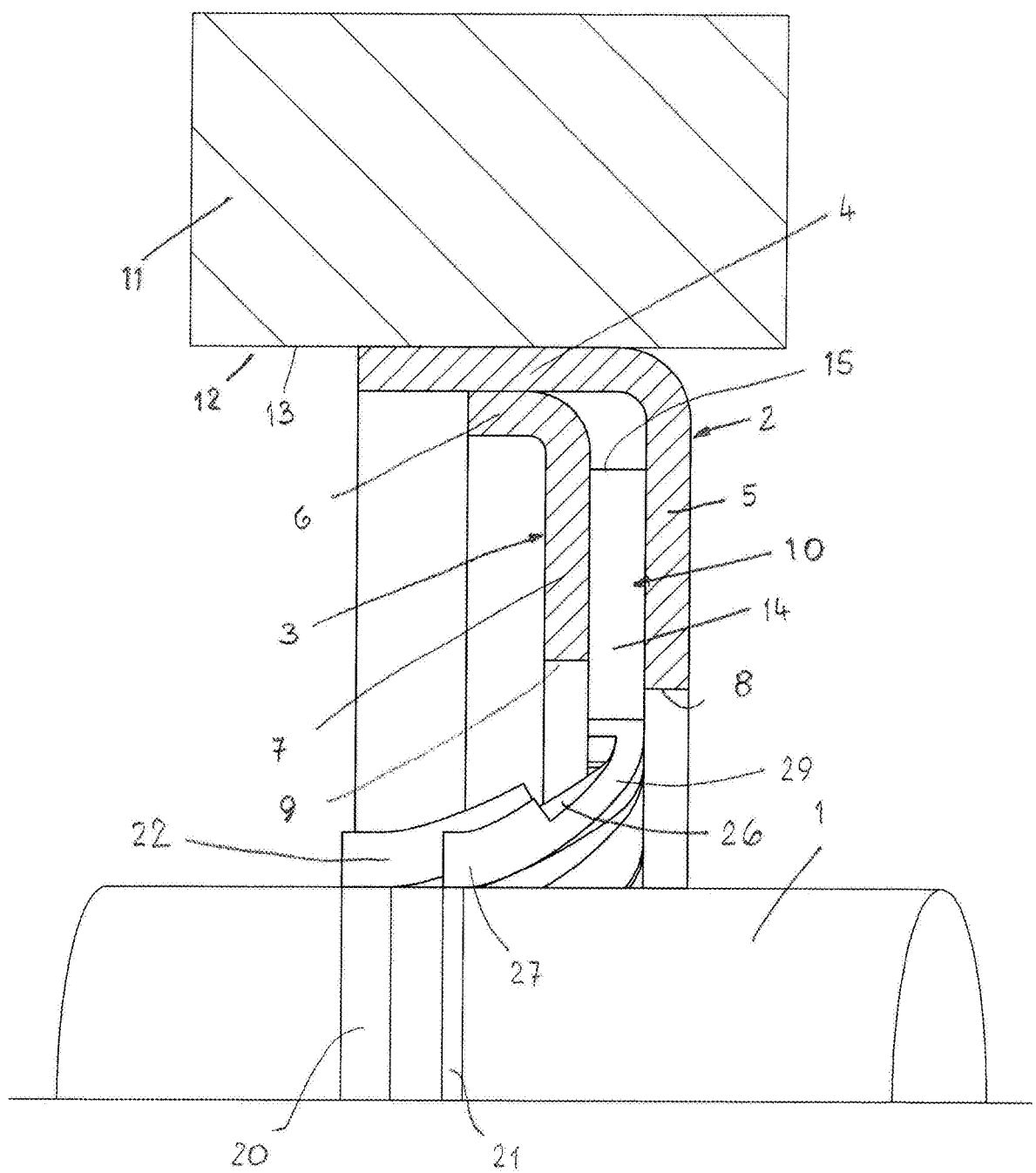
FIG. 3 is an enlarged illustration of a half-section of the shaft grounding ring according to the invention.

It is known that converter-operated alternating current motors induce harmful voltages at the motor shaft 1 (FIG. 3). When the voltage surpasses the resistance of the lubricant in a shaft bearing, the voltages will discharge through the shaft bearing that is greatly stressed thereby and will become damaged over longer periods of use. With the shaft grounding rings, the induced harmful voltages in the motor shaft 1 are reliably dissipated so that the voltages no longer are dissipated through the shaft bearing.

The shaft grounding rings however cannot only be used in motors but, for example, also in transmissions. In general, the shaft grounding rings are employed where induced voltages, currants or electrical charges are to be dissipated away from shafts.

The shaft grounding ring (FIG. 3) has an outer clamping ring 2 which is comprised of electrically conductive material. The outer clamping ring 2 forms a housing and has an L-shaped cross section in axial section. The outer clamping ring 2 surrounds an inner clamping ring 3 which is also comprised of electrically conductive material and has an L-shaped cross section in axial section. The outer clamping ring 2 has a cylindrical wall 4 which passes into an inwardly extending radial flange 5 extending perpendicular to the wall 4. The inner clamping ring 3 has also a cylindrical wall 6 which passes into an inwardly extending radial flange 7. Both annular flanges 5, 7 have centrally a through opening 8, 9 for the shaft 1.

The radial flange 5 of the outer clamping ring 2 has a greater width than the radial flange 7 of the inner clamping ring 3. The wall 4 of the outer clamping ring 2 projects past the wall 6 of the inner clamping ring 3. The inner clamping ring 3 is positioned with its wall 6 with press fit at the inner side of the wall 4 of the outer clamping ring 2.

With the two clamping rings 2, 3 that are advantageously comprised of metal, a dissipation element in the form of a disk-shaped dissipation body 10 is axially clamped. It is comprised of electrically conductive material, preferably of a conductive PTFE (polytetrafluoroethylene). In principle, the dissipation body 10 can be comprised of any suitable electrically conductive material with which the induced voltages can be dissipated away from the shaft 1 to a grounded housing 11. The preferred use of conductive PTFE has the advantage that this compact material is chemically and thermally resistant and exhibits only minimal friction.

The dissipation body 10 is reliably clamped between the two radial flanges 5, 7 of the clamping rings 2, 3.

In the region between the two radial flanges 5, 7, the dissipation body 10 can additionally be connected to the radial flange 5 and/or the radial flange 7 by means of an adhesive that is advantageously electrically conductive.

The shaft grounding ring is inserted into an installation space 12 of a machine element in the form of housing 11, only schematically illustrated, with press fit such that the wall 4 of the outer clamping ring 2 is contacting with compression an inner wall 13 of the installation space 12 of the housing 11. The housing 11 itself is grounded so that the voltage can be dissipated from the machine element in the form of the shaft 1 through the dissipation body 10 and the outer clamping ring 2 to the grounded housing 11.

The clamping ring 2 must not mandatorily be inserted with press fit into an installation space but can be, for example, also fastened by transversely projecting tabs to a grounded machine element. Also, it is possible to connect the clamping ring 2 directly to a grounded machine element by screwing. In the illustrated embodiment, a motor housing is shown only as an example of a grounded machine element. The dissipation of the voltages can also be realized through other machine elements that are appropriately grounded.

The annular dissipation body 10 has an outer annular section or ring 14 which is axially clamped across most of its radial width between the radial flanges 5, 7 of the clamping rings 2, 3. The radial outer rim 15 of the ring 14 has a spacing from the transition of the radial flanges 5, 7 into the walls 4, 6 of the clamping rings 2, 3. Radially inwardly, the ring 14 projects past the two radial flanges 5, 7. In order for the dissipation body 10 to be reliably clamped between the clamping rings 2, 3, the ring 14 has a constant thickness about its circumference and across its radial width.

Radially inwardly, flap sections 16, 17 are projecting away from the ring 14; the flap sections 16, 17 in radial direction have different lengths and are contacting with elastic deformation the shaft 1. The flap sections 16, 17 are positioned about the circumference of the dissipation body 10 at a spacing one after another so that they can be bent elastically relative to the outer ring 14 without mutual impairment in the installed position.

Since the ring 14 is projecting radially inwardly past the rim of the through openings 8, 9, the flap sections 16, 17 can be elastically deformed in the installed position of the shaft grounding ring without impairment by the rim of the through openings 8, 9.

Due to the elastic deformation of the flap sections 16, 17, it is achieved that they are contacting a really the shaft 1 and thus can reliably dissipate the voltages away from the shaft 1.

The slots 18, 19 located between the flap sections 16, 17 ensure that the flap sections 16, 17 are not contacting the shaft 1 with too great a force. The flap sections 16, 17 and the slots 18, 19 are configured such that, on the one hand, the flap sections 16, 17 are contacting with satisfactory radial force the shaft 1 and, on the other hand, are contacting the shaft 1 only with such a force that wear of the flap sections 16, 17 in the contact region with the shaft 1 is as small as possible.

The use of electrically conductive PTFE for the dissipation body 10 has the advantage that this material has a so-called memory effect. This memory effect has the result that the preferably elastically deformed flap sections 16, 17 have the tendency to return into their initial position even when they are not only elastically bent. In this way, a restoring force results which counteracts a possible wear of the flap sections 16, 17 and ensures for the period of use a constant reliable contact with the shaft 1 in this way.

The dissipation body 10 which is comprised of electrically conductive PTFE enables also switching of the rotational direction of the shaft 1. Erection of the flap sections 16, 17 upon reversal of the rotational direction of the shaft 1 does not occur.

Since the flap sections 16, 17 in radial direction have different lengths, they are also contacting two different locations of the shaft 1. In this way, two different running tracks 20, 21 are formed on the shaft 1. Depending on the radial length of the flap sections 16, 17, the running tracks 20, 21 have axial spacing relative to each other.

In the embodiment according to FIG. 3, the running track 20 is wider than the running track 21. Depending on the configuration of the flap sections 16, 17, the running tracks 20, 21 generated by the flap sections 16, 17 can also be of the same width. Also, it is possible that the running track 20 is smaller than the running track 21.

Figure 1:
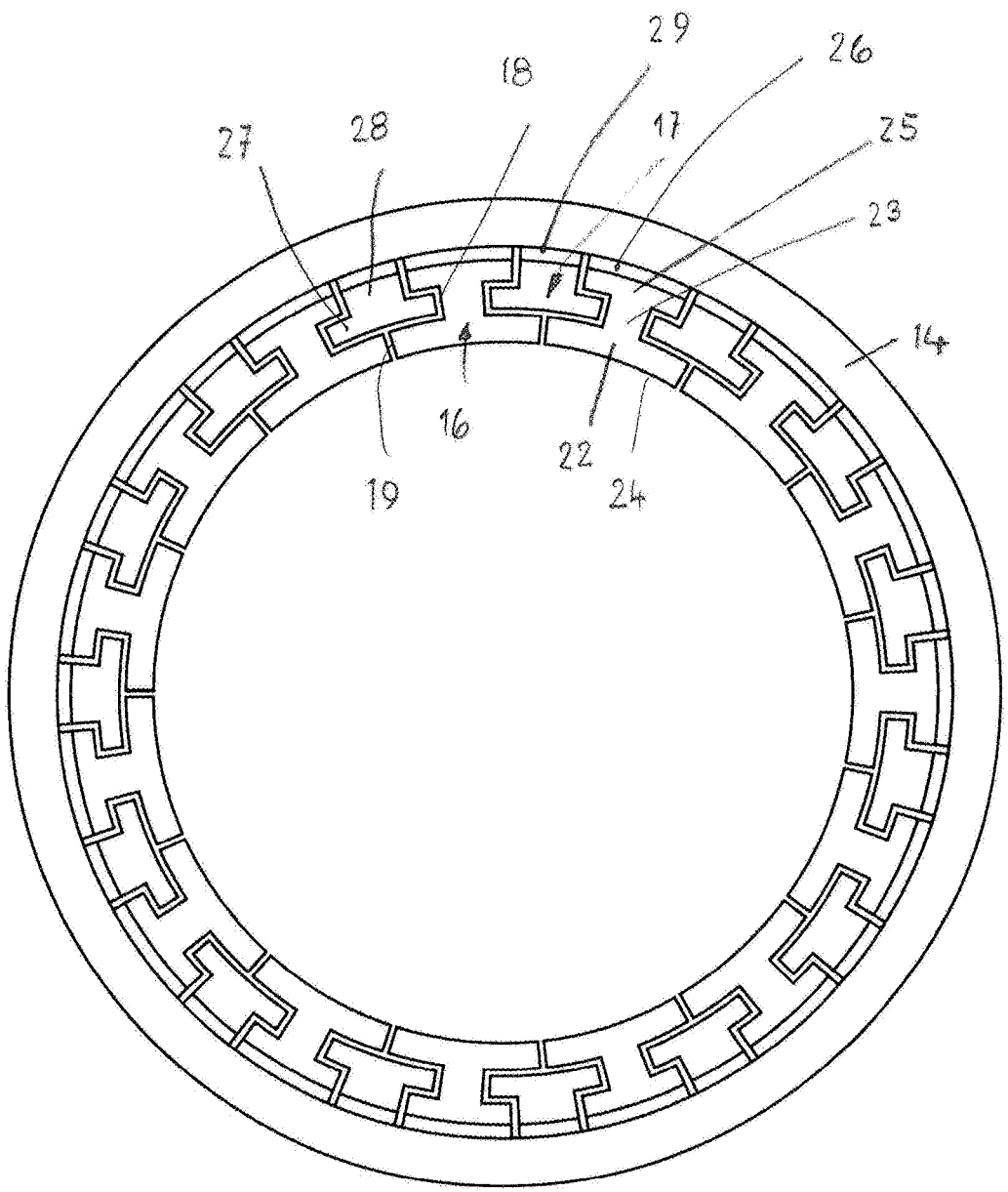
FIG. 1 is a view of a first embodiment of a dissipation body according to the invention of a shaft grounding ring according to the invention.

In the embodiment according to FIG. 1, the flap sections 16, 17 are T-shaped, respectively.

The flap sections 16 have a web 22 which is projecting away from a radially extending base 23. The web 22 projects with the same length past the base 23 in both circumferential directions of the dissipation body 10. The outer side 24 of the web 22 extends in a curved configuration about the axis of the dissipation body 10.

The radial thickness of the web 22 in an exemplary fashion is less than the width of the base 23 measured in circumferential direction. In radial direction, the base 23 is also wider than the web 22. In this way, the base 23 imparts to the section 16 a satisfactory stiffness while the relatively thin web 22 in the installation position provides a secure contact at the shaft 1 and thus a reliable dissipation of the voltages away from the shaft 1.

The base 23 connects the radially inwardly positioned web 22 with a radially outwardly positioned web 25 which is also projecting past the base 23 in circumferential direction of the dissipation body 10. The radial inner web 22 is however longer than the outer web 25 in the circumferential direction.

At the transition of the web 25 into the closed annular section 14, the web 25 is provided with a weakened or reduced cross-sectional portion in the web material which extends across the entire circumferential length of the web 25 for forming a joint 26. This cross-sectional weakened portion in the web material can be achieved by a stamping or turning process.

Due to the joint 26 it is ensured that the section 16 can be bent reliably elastically. By means of the joint 26 the contact pressure of the section 16 or of its web 22 against the shaft 1 can also be adjusted.

The stamping/turning process for forming the joint 26 can be eliminated when the width of the inner web 22 measured in the circumferential direction is relatively minimal.

The flap sections 16 in circumferential direction of the dissipation body 10 are arranged such that, when the dissipation body is not deformed, they have only a minimal spacing relative to each other that is determined by the width of the slots 19. When the flap sections 16 are elastically deformed in the installed position, the spacing between flap sections 16 neighboring each other in circumferential direction increases accordingly. Since in the illustrated embodiment the webs 22 of the flap sections 16 in circumferential direction are positioned at a relatively small spacing one after another, the voltages are reliably dissipated away from the shaft 1.

The shorter flap sections 17 are positioned between neighboring longer flap sections 16. The flap sections 17 are T-shaped and comprise the web 27 which is projecting away from the radially inwardly extending base 28. In contrast to the flap sections 16, the base 28 of the flap sections 17 adjoins radially the closed ring (annular section) 14 of the dissipation body 10. At the transition from the base 28 into the ring (annular section) 14, a joint 29 is provided in this region which is formed by a cross-sectional weakened portion in the material of the base 28 in the embodiment. The cross-sectional weakened (reduced) portion can be generated by a stamping or turning process. Such a stamping or tuning process is not needed when the base 28 in circumferential direction of the dissipation body 10 has only minimal width and/or the dissipation body 10 has relatively minimal thickness.

The web 27 of the flap sections 17 projects into the region between the inner web 22 and the outer web 25 of two neighboring elongate flap sections 16, respectively. In order for the two flap sections 16, 17 in the installation position of the shaft grounding ring to bend reliably elastically, the two flap sections 16, 17 are separated from each other about their periphery by means of the slots 18, 19.

The base 28 of the flap section 17 is positioned in the region between the outer webs 25 of the neighboring flap sections 16.

The webs 27 of the flap sections 17 in circumferential direction of the dissipation body 10 are shorter than the radial inner webs 22 of the flap sections 16. The base 28 in circumferential direction is wider than the base 23 of the flap sections 16.

Since the base 23 of the longer flap sections 16 is positioned between neighboring webs 27 of the shorter flap sections 17, the webs 27 in circumferential direction of the dissipation body 10 have a greater spacing relative to each other than the webs 22 of the longer flap sections 16. Due to the T-shape of the shorter flap sections 17, it is ensured that the voltages can be reliably dissipated away from the shaft 1 also across the shorter flap sections 17.

Due to the flap sections 16, 17 of different lengths, a two-track shaft contact by the running tracks 20, 21 is produced in the embodiment. Due to this multi-track shaft contact an increased contact surface between the flap sections 16, 17 and the shaft 1 is produced. Due to the T-shape, a high surface contact per flap section 16, 17 is provided because the latter is contacting the shaft 1 with the web 22, 27. The dissipation body 10 ensures a long-term good dissipation of the voltages away from the shaft 1.

In the described embodiment, the flap sections 16 are of identical configuration relative to each other. Also, the flap sections 16, 17 of different lengths are positioned adjacent to each other in alternating arrangement.

In another configuration, it is possible that flap sections 16 or 17 of the same length are positioned one after another in circumferential direction. In this way, for example, three long sections 16, adjoined by three short flap sections 17, and so on can be provided about the circumference of the dissipation body 10. Also, the number of flap sections 16, 17 of identical configuration positioned one after another can vary. In this way, the shaft grounding ring can be optimally adapted to a specific application situation.

The flap sections 16, 17 extend radially away from the outer ring 14 inwardly, respectively.

Figure 2:
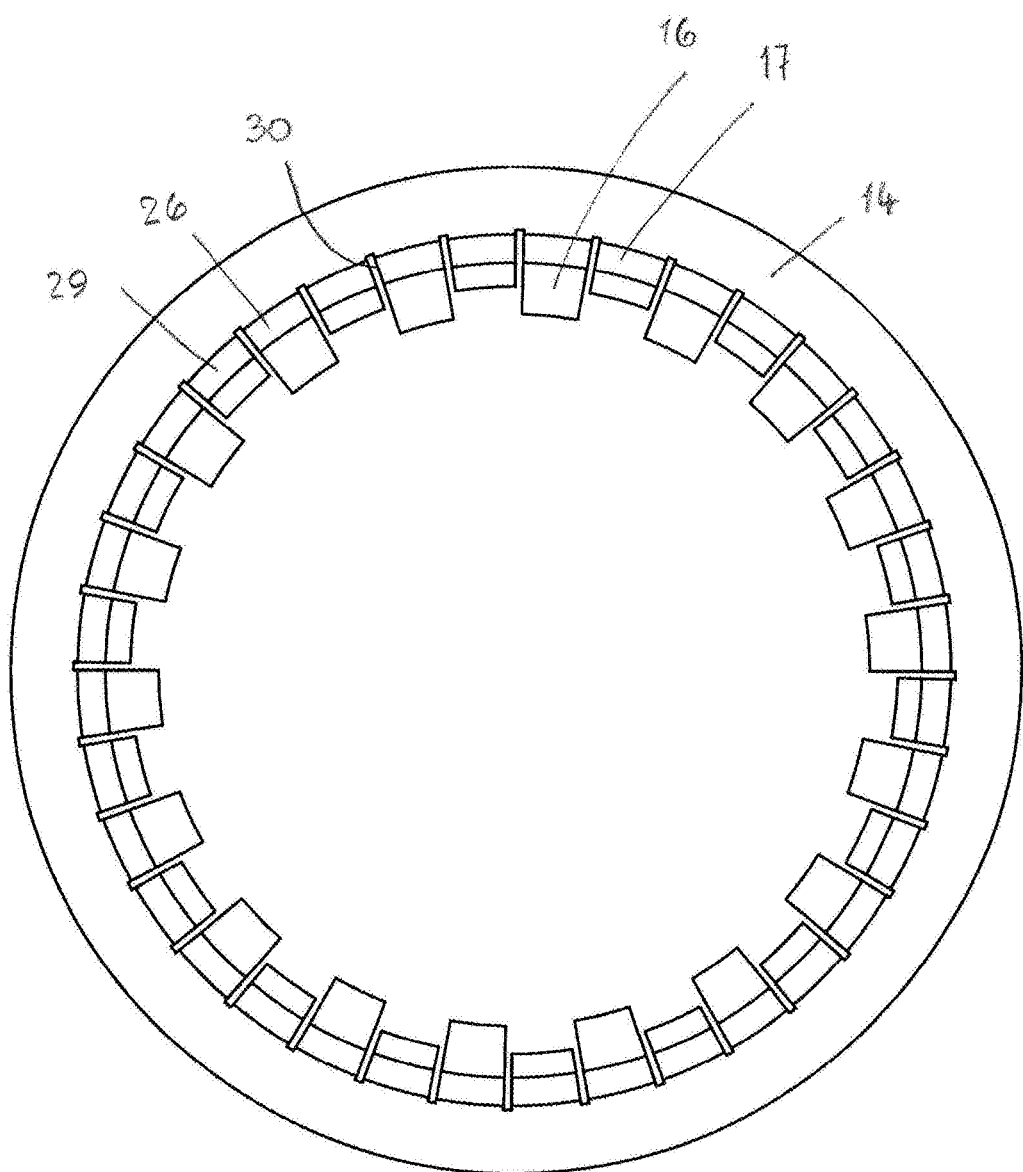
FIG. 2 is a view of a second embodiment of a dissipation body according to the invention of a shaft grounding ring according to the invention.

In the dissipation body 10 according to FIG. 2, the flap sections 16, 17 of different lengths extend also away from the outer closed ring (annular section) 14 radially inwardly. The flap sections 16, 17 are embodied as approximately rectangular tongues which, at a spacing to each other, are alternatingly arranged one after another in the circumferential direction of the dissipation body 10. The shorter flap sections 17 are thus positioned, respectively, between neighboring longer flap sections 16. The flap sections 16, 17 are separated from each other by radially extending slots 30 so that the flap sections 16, 17 can be bent without problem elastically in the installation position of the shaft grounding ring.

The tongue-shaped flap sections 16, 17 can also be provided with the joints 26, 29 in order to facilitate the elastic deformation of the flap sections 16, 17 and in particular to influence the contact pressure of the flap sections 16, 17 at the shaft 1. The joints 26, 29, as in the preceding embodiment, can be generated by a stamping or turning process. Such a cross-sectional reduction produced by a stamping or turning process for forming the joints 26, 29 is not needed when the flap sections 16, 17 in circumferential direction have only a minimal width. The flap section 16, 17, as in the preceding embodiment, can then be easily elastically bent.

As in the preceding embodiment, the distribution of the long and short flap sections 16, 17 can be varied across the circumference of the dissipation body 10.

The two flap sections 16, 17 of different lengths enable the multi-track shaft contact described in connection with FIG. 1. The multi-track shaft contact has the advantage that per running track 20, 21 only minimal heat development occurs. Also, due to this two-track shaft contact a long-term good dissipation is enabled.

The flap sections 16, 17 of different lengths of the described embodiments enable also the generation of differently high contact pressures of the section 16, 17 on the shaft 1. For example, it is possible to have the longer flap sections 16 contact the shaft 1 with reduced radial force in comparison to the shorter flap sections 17.

The dissipation body 10 can be designed such that it has more than two kinds of flap sections 16, 17 of different lengths. Then, on the shaft 1 more than two running tracks 20, 21 are created which are formed by the contact of the elastically bent flap sections of the dissipation body 10 with the shaft 1. The surface contact between the flap sections and the shaft 1 is enlarged even more for such a multi-track configuration so that the dissipation of voltages away from the shaft 1 can be significantly improved.

The PTFE disk which is advantageously employed for the dissipation body 10 can have a thickness that is preferably in the range of 0.3/0.4 mm and approximately 1 mm. Inasmuch as the flap sections 16, 17 are provided with the joints 26, 29, the joints 26, 29 can be provided by a stamping process but also, for example, by a turning process. In the region of the joints 26, 29, the dissipation body 10 has, for example, a thickness that is somewhat more than half the thickness of the dissipation body 10.

The dissipation body 10 can be completely enclosed by a coating of electrically conductive material. Such a material is, for example, a silver lacquer which can be fixedly and permanently applied. As a coating, for example, also an electrically conductive foil can be employed, for example, a copper foil that can be glued on, for example.

Due to such a coating, the material of the dissipation body 10 itself must not be electrically conductive. It is however advantageous when the dissipation body is also made of an electrically conductive material, preferably of the aforementioned conductive PTFE.

The shaft grounding ring can also be designed such that the clamping ring 2 with its wall 4 is seated fixedly on the shaft 1 and the flap sections 16, 17 are contacting the grounded housing 11 with elastic deformation.

In both embodiments, the flap sections 16, 17 can be produced, for example, by laser cutting, stamping and the like.

The specification incorporates by reference the entire disclosure of German priority document 10 2017 009 360.1 having a filing date of Oct. 6, 2017.

While specific embodiments of the invention have been shown and described in detail to illustrate the inventive principles, it will be understood that the invention may be embodied otherwise without departing from such principles.

What is claimed is:

1. A shaft grounding ring comprising:
an annular housing comprised of an electrically conductive material configured to be connected electrically conductively to a first machine element;
at least one annular dissipation body electrically conductively connected to the annular housing and at least partially comprised of an electrically conductive material;
the at least one annular dissipation body configured to be electrically conductively connected to a second machine element;
wherein the at least one annular dissipation body comprises an annular section and further comprises elastically deformable flap sections connected to the annular section and projecting away from the annular section, wherein the flap sections have different lengths.

2. The shaft grounding ring according to claim 1, wherein the flap sections are uniformly distributed about a circumference of the annular section.

3. The shaft grounding ring according to claim 1, wherein the flap sections include first flap sections of a first length and second flap sections of a second length different from the first length, wherein the first and second flap sections are uniformly distributed about a circumference of the annular section.

4. The shaft grounding ring according to claim 3, wherein the first and second flap sections are arranged alternatingly one after another in the circumferential direction.

5. The shaft grounding ring according to claim 3, wherein the first flap sections are of identical configuration.

6. The shaft grounding ring according to claim 3, wherein the second flap sections are of identical configuration.

7. The shaft grounding ring according to claim 1, wherein the flap sections are projecting radially away from the annular section.

8. The shaft grounding ring according to claim 1, wherein the flap sections and the annular section are formed together as one piece.

9. The shaft grounding ring according to claim 1, wherein the flap sections in an undeformed state of the at least one annular dissipation body are spaced apart from each other.

10. The shaft grounding ring according to claim 1, wherein the at least one annular dissipation body is comprised of electrically conductive PTFE (polytetrafluoroethylene).

11. The shaft grounding ring according to claim 1, wherein at least some of the flap sections are provided with a joint.

12. The shaft grounding ring according to claim 11, wherein the joint is formed by a cross-sectional reduced portion of the flap sections.

13. The shaft grounding ring according to claim 1, wherein the flap sections have an approximately rectangular shape.

14. The shaft grounding ring according to claim 1, wherein the flap sections are approximately T-shaped.

15. The shaft grounding ring according to claim 1, wherein the flap sections include first flap sections of a first length and second flap sections of a second length different from the first length, wherein the first flap sections have a first contour and the second flap sections have a second contour different from the first contour.

16. The shaft grounding ring according to claim 1, wherein the flap sections are approximately T-shaped and comprise a web extending in a circumferential direction of the annular section.

17. The shaft grounding ring according to claim 16, wherein the flap sections include first T-shaped flap sections of a first length and second T-shaped flap sections of a second length shorter than the first length, wherein the second T-shaped flap sections are positioned such between the first T-shaped sections that the webs of the second T-shaped flap sections are covered radially by the webs of the first T-shaped flap sections.

18. A shaft grounding ring according to claim 1, wherein the at least one annular dissipation body is comprised of non-conductive material and is coated with a conductive material.

19. A dissipation body for a shaft grounding ring, the dissipation body comprising an annular section and further comprising elastically deformable flap sections connected to the annular section and projecting away from the annular section, wherein the flap sections have different lengths, wherein the dissipation body is comprised of an at least partially electrically conductive material.

20. The dissipation body according to claim 19, wherein the flap sections include first flap sections of a first length and second flap sections of a second length different from the first length, wherein the first and second flap sections are uniformly distributed about a circumference of the annular section.

* * * * *